(12) United States Patent
McLuckie et al.

(10) Patent No.: US 11,277,959 B2
(45) Date of Patent: Mar. 22, 2022

(54) VACUUM SYSTEM

(71) Applicant: CNH Industrial America LLC, New Holland, PA (US)

(72) Inventors: Austin McLuckie, Coal City, IL (US); Chad Johnson, Arlington Heights, IL (US); Brandon Kuboushek, New Lenox, IL (US)

(73) Assignee: CNH Industrial America LLC, New Holland, PA (US)

( * ) Notice: Subject to any disclaimer, the term of this patent is extended or adjusted under 35 U.S.C. 154(b) by 144 days.

(21) Appl. No.: 16/387,309

(22) Filed: Apr. 17, 2019

(65) Prior Publication Data

US 2020/0329628 A1    Oct. 22, 2020

(51) Int. Cl.
*A01C 7/08* (2006.01)
*A01C 7/04* (2006.01)

(52) U.S. Cl.
CPC .............. *A01C 7/082* (2013.01); *A01C 7/042* (2013.01)

(58) Field of Classification Search
CPC ......... A01C 7/082; A01C 7/042; A01C 7/044; A01C 7/046
See application file for complete search history.

(56) References Cited

U.S. PATENT DOCUMENTS

| | | | |
|---|---|---|---|
| 3,393,516 A | 7/1968 | Markowski | |
| 4,474,511 A | 10/1984 | Labbe | |
| 4,852,809 A | 8/1989 | Davis et al. | |
| 5,797,793 A | 8/1998 | Matousek et al. | |
| 6,443,671 B1 | 9/2002 | Weiste | |
| 6,951,354 B1 | 10/2005 | Paulson | |
| 7,549,383 B2 | 6/2009 | Sauder et al. | |
| 7,802,651 B2 | 9/2010 | Park et al. | |
| 8,001,914 B2 | 8/2011 | Peterson et al. | |
| 8,443,742 B2 | 5/2013 | Orrenius | |
| 8,698,057 B2 | 4/2014 | Park et al. | |
| 8,861,195 B2 | 10/2014 | Fu | |
| 9,031,749 B2 | 5/2015 | Hubalek et al. | |
| 9,599,124 B2 | 3/2017 | Roberge et al. | |
| 9,648,801 B2 | 5/2017 | Borkgren et al. | |
| 9,901,026 B2 | 2/2018 | Kinzenbaw et al. | |

(Continued)

FOREIGN PATENT DOCUMENTS

CN     203270120       11/2013
CN     206580298 U     10/2017

(Continued)

OTHER PUBLICATIONS

Oval Exhaust Tubing 90 Degree Twist, Nov. 26, 2018.

(Continued)

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

A vacuum system that includes a planter frame. A row unit bracket couples to the planter frame. A fan couples to the planter frame and draws air through a row unit. An exhaust duct extends through the row unit bracket. The exhaust duct couples to the fan and discharges airflow from the fan towards the ground. A diffuser reduces a speed of and/or redirects the airflow as the airflow exits the exhaust duct.

20 Claims, 11 Drawing Sheets

(56) References Cited

U.S. PATENT DOCUMENTS

| | | | |
|---|---|---|---|
| 10,030,796 B2 * | 7/2018 | Johnson | A01C 7/082 |
| 10,718,252 B2 | 7/2020 | Im | |
| 10,820,480 B2 * | 11/2020 | Hubner | A01B 71/08 |
| 2012/0312212 A1 * | 12/2012 | Cruson | A01C 7/201 |
| | | | 111/176 |
| 2013/0327261 A1 | 12/2013 | Bergere | |
| 2016/0242352 A1 * | 8/2016 | Hussherr | A01C 7/082 |
| 2017/0086354 A1 | 3/2017 | Groves et al. | |
| 2017/0369257 A1 | 12/2017 | Bent et al. | |
| 2019/0216006 A1 | 7/2019 | Hubner | |
| 2019/0380260 A1 | 12/2019 | Meyer et al. | |
| 2019/0387663 A1 | 12/2019 | Wang | |
| 2020/0337222 A1 | 10/2020 | Anderson et al. | |

FOREIGN PATENT DOCUMENTS

| | | | |
|---|---|---|---|
| DE | 102005024739 A1 * | 12/2006 | A01C 7/042 |
| DE | 102011000996 A1 | 9/2012 | |
| EP | 2147588 A1 * | 1/2010 | A01C 7/081 |
| EP | 3219186 A1 | 9/2017 | |
| IN | 904MUM2010 | 6/2010 | |
| WO | 2012029003 | 3/2012 | |
| WO | 2018107259 A1 | 6/2018 | |

OTHER PUBLICATIONS 6 in. Straight Oval-to-Round Boot-OTRB6, The Home Depot, Nov. 26, 2018.

1800 Ceiling, Ceiling Air Diverter for 2'x2' Ceiling Vent, 3 pgs, retrieved on Mar. 5, 2019 from https://www.1800ceiling.com/air-diverter-white-1pack.

* cited by examiner

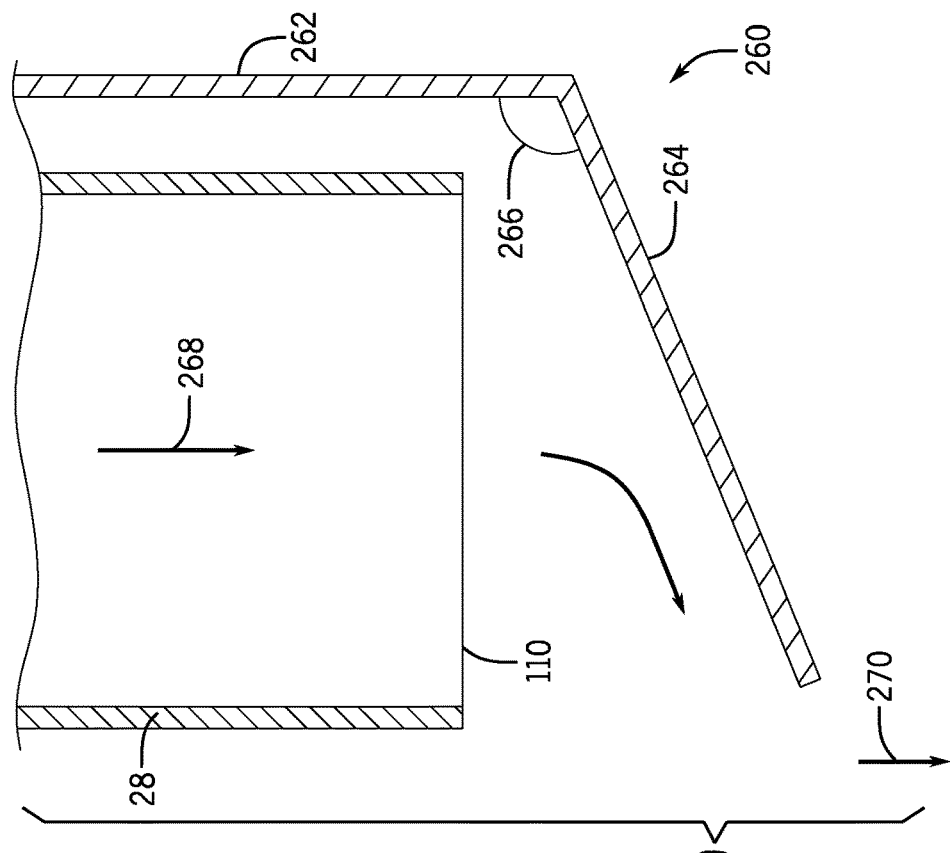
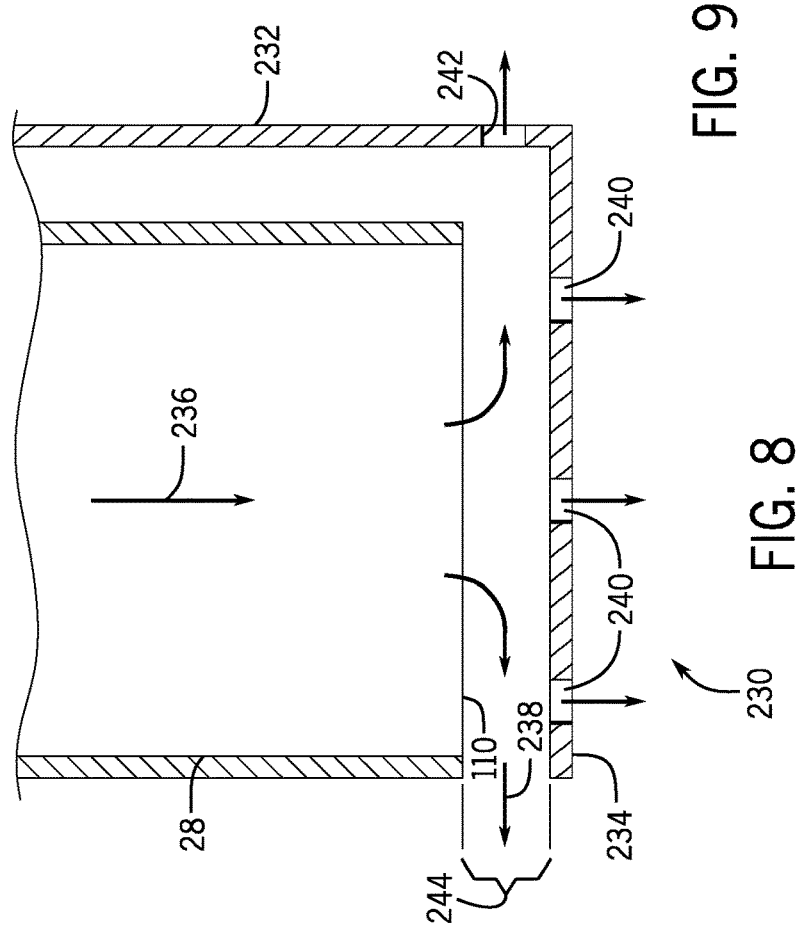
FIG. 8
FIG. 9

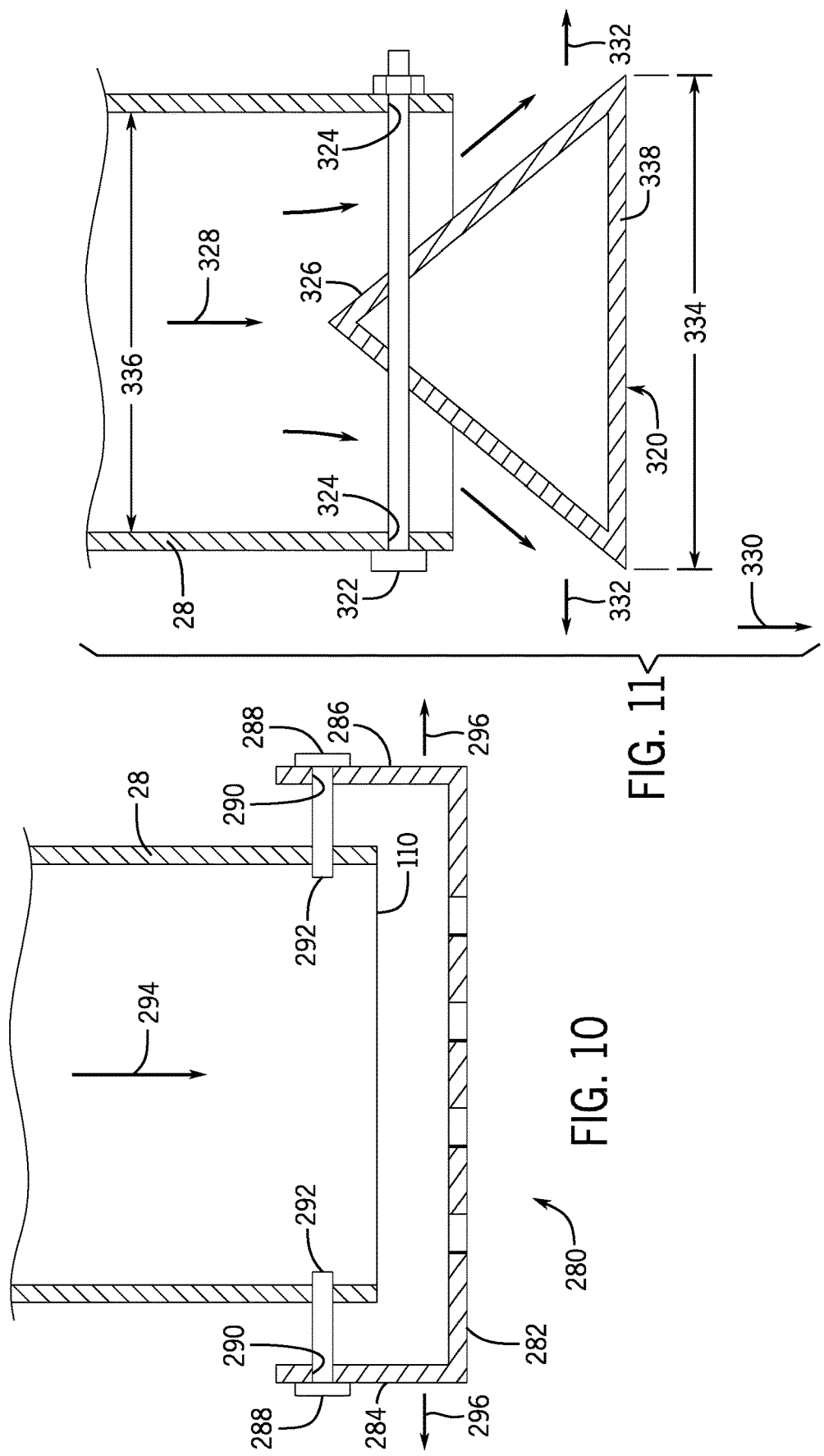

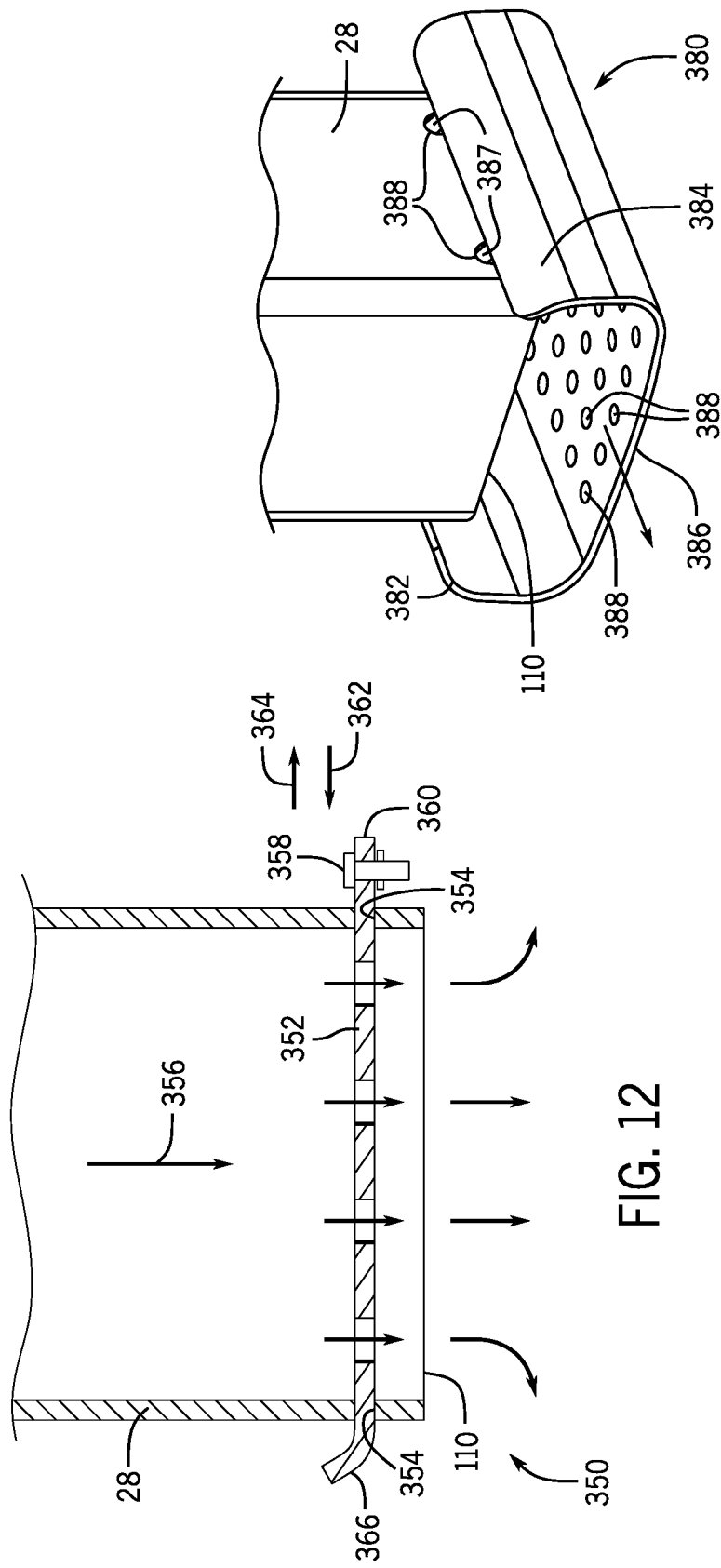

VACUUM SYSTEM

BACKGROUND

The present application relates generally to agricultural implements. Planting implements are typically towed behind a tractor across fields. These planting implements include multiple row units distributed across the width of the implement. The row units deposit seeds at a desired spacing and soil depth to form rows of planted seeds. Each row unit may include a seed meter that controls the rate and/or spacing of the seeds deposited in the ground. Some seed meters use a fan induced vacuum pressure to meter the seeds, which are then placed in the field by a row unit. In some situations, the air discharged by the fan may be directed towards the ground. Unfortunately, the force of the discharged air may lift or kick up plant particulate laying on the ground. The plant particulate may then be sucked or drawn into the seed meter by the force of the vacuum. Inside the seed meter, the plant particulate may plug apertures and otherwise interfere with operation of the seed meter. The plant particulate may also buildup on the vented areas of the meter housing where air is drawn into the seed meter. This build up causes the vents to plug and reduces the air pressure differential needed for the seed meter to perform properly.

BRIEF DESCRIPTION

In one embodiment, a vacuum system that includes a planter frame. A row unit bracket couples to the planter frame. A fan couples to the planter frame and draws air through a row unit. An exhaust duct extends through the row unit bracket. The exhaust duct couples to the fan and discharges airflow from the fan towards the ground. A diffuser reduces a speed of and/or redirects the airflow as the airflow exits the exhaust duct.

In another embodiment, a vacuum system that includes an exhaust duct that extends through a row unit bracket. The exhaust duct couples to a fan and discharges airflow from the fan towards the ground. A diffuser reduces a speed of and/or redirect the airflow as the airflow exits the exhaust duct.

DRAWINGS

These and other features, aspects, and advantages of the present invention will become better understood when the following detailed description is read with reference to the accompanying drawings in which like characters represent like parts throughout the drawings, wherein:

FIG. 8 is a partial cross-sectional side view of an exhaust duct with a diffuser, according to an embodiment of the disclosure;

FIG. 9 is a partial cross-sectional side view of an exhaust duct with a diffuser, according to an embodiment of the disclosure;

FIG. 10 is a partial cross-sectional side view of an exhaust duct with a diffuser, according to an embodiment of the disclosure;

FIG. 11 is a partial cross-sectional side view of an exhaust duct with a diffuser, according to an embodiment of the disclosure;

FIG. 12 is a partial cross-sectional side view of an exhaust duct with a diffuser, according to an embodiment of the disclosure;

FIG. 13 is a partial perspective view of an exhaust duct with a diffuser, according to an embodiment of the disclosure;

DETAILED DESCRIPTION

Figure 1:
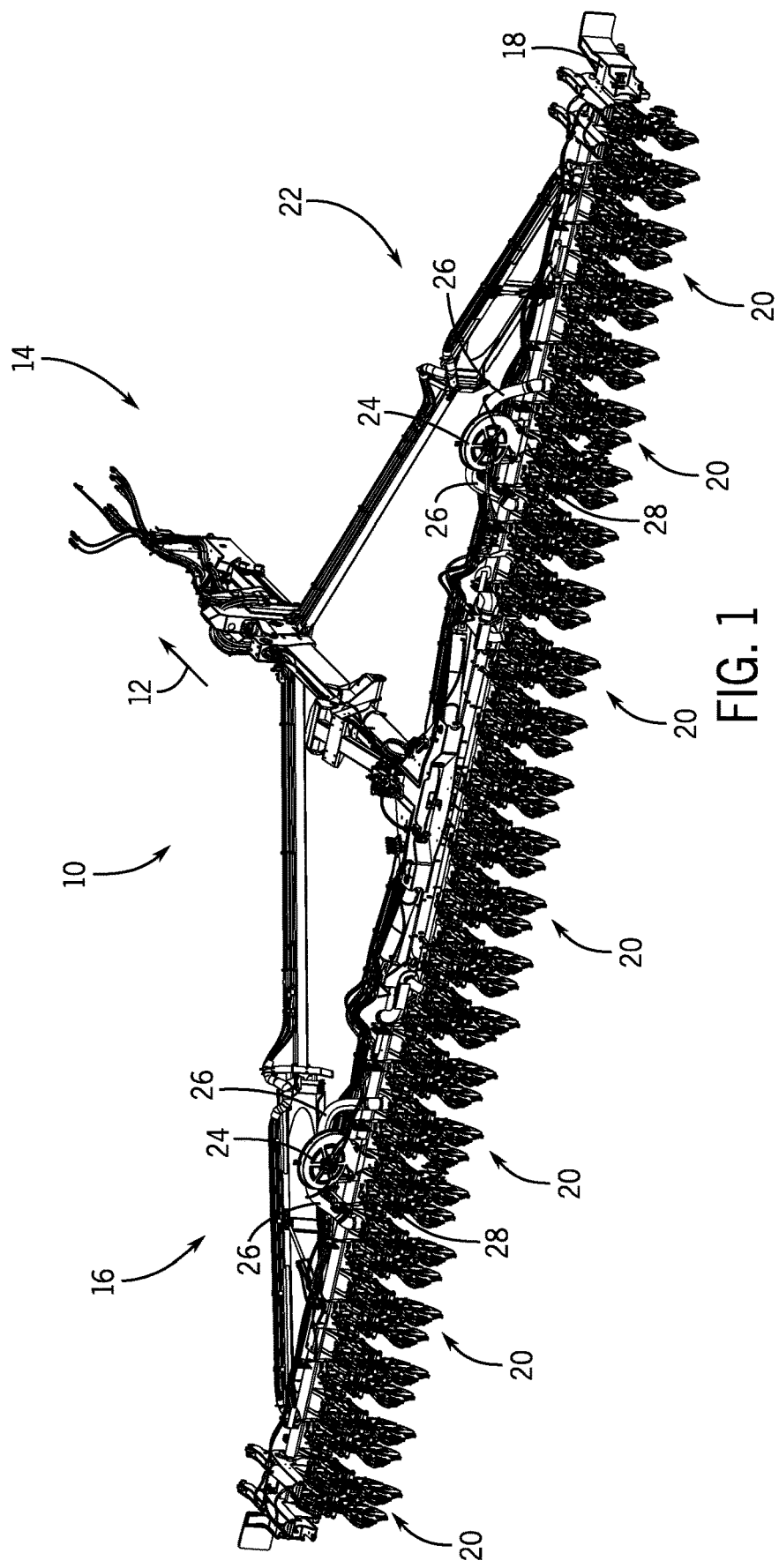
FIG. 1 is a perspective view of an agricultural implement, according to an embodiment of the disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Seed planting implements generally utilize multiple row units to plant rows of seeds in the ground. Each row unit may include a seed meter to control the rate and/or spacing of the deposited seeds. These seed meters utilize vacuum pressure to attach seeds to a rotating seed disc, which controls the rate at which seeds are output by the seed meter. As used herein, "vacuum pressure" is intended to describe a pressure differential from atmospheric pressure and not necessarily a true vacuum.

In some situations, the seeds may have a coating, such as fungicide or pesticide. During planting operations, some of the coating may separate from the seeds as the seeds contact each other and/or as the seeds contact components of the seed planting implement. The vacuum pressure draws the separated coating through the metering system and then discharges it into the environment. In order to reduce the spread of the coating, the agricultural implement includes an exhaust duct system that directs the discharged airflow from the fan towards the ground. Unfortunately, the force of the discharged air may lift or kick up plant particulate laying on the ground (e.g., wheat chaff). The plant particulate may then be sucked or drawn into the seed meter or may build up on the air entry vents of the seed meter by the force of the vacuum. In order to reduce and/or block the discharged air from kicking up or lifting the plant particulate into the air, the vacuum system includes a diffuser. In operation, the diffuser reduces or redirects the velocity of the air discharged by the exhaust duct to block and/or reduce the ability of the discharged air to lift particulate matter off the ground.

FIG. 1 is a perspective view of an agricultural implement 10 (e.g., planting implement). The agricultural implement 10 includes a hitch assembly 14, a main frame assembly 16, a toolbar 18, row units 20, and seed tanks. In some embodiments, when a work vehicle is coupled to the implement 10 by the hitch assembly 14, the implement 10 may be towed along a direction of travel 12 by the work vehicle, such as a tractor or other prime mover.

As depicted, the hitch assembly 14 is coupled to the main frame assembly 16 and the main frame assembly 16 is coupled to the toolbar 18. Additionally, as depicted, the toolbar 18 is coupled to multiple row units 20. Thus, as the work vehicle tows the implement 10, each of the row units 20 may deposit seeds at a desired depth beneath the soil surface, thereby establishing rows of planted seeds. In some embodiments, the bulk of the seeds to be planted may be stored in seed tanks. Thus, as seeds are planted by the row units 20, a pneumatic distribution system may distribute additional seeds from the seed tanks to the individual row units 20.

It should be noted that while the illustrated implement 10 includes 47 row units, alternative implements may include more or fewer row units 20. For example, certain implements 10 may include 6, 8, 12, 16, 24, 32, or 36 row units, or more. In addition, the spacing between row units may be particularly selected based on the type of seed being planting. For example, the row units may be spaced 30 inches from one another for planting corn, and 15 inches from one another for planting soy beans.

The seeds are metered through the row units 20 with a metering system that uses vacuum pressure created by a vacuum system 22. The vacuum pressure is created by one or more fans 24 (e.g., 1, 2, 3, 4, or more) that couple to the toolbar 18 with conduits 26. In operation, the fans 24 draw air out of the toolbar 18 creating a vacuum chamber. In some embodiments the fans 24 may draw air through external air ducts coupled to the toolbar 18. Hoses (e.g., vacuum hoses) extend between the row units 20 and the toolbar 18, which enable the vacuum pressure to transfer to the metering system. The vacuum pressure draws air through the metering system on the row units 20, and through the hoses that couple the metering system to the toolbar 18. The air drawn or sucked out of the toolbar 18 with the fans 24 is then directed towards the ground with one or more exhaust ducts 28. For example, each fan 24 may couple to a respective exhaust duct 28. By directing the airflow toward the ground with the exhaust duct 28, the vacuum system 22 may reduce the spread of chemical coatings (e.g., pesticide, fungicide) that may separate from the seeds and that is sucked into the vacuum system 22. As will be discussed below, the vacuum system 22 includes a diffuser that couples to each exhaust duct 28 to reduce the force of the discharged air from the exhaust ducts 28. In some embodiments, the diffusor may be integrally formed with the exhaust ducts 28 (e.g., one-piece). By reducing the force of the discharged air from the exhaust ducts 28, the diffuser reduces and/or blocks the discharged air from kicking up debris such as wheat chaff or other plant particulate. With less particulate in the air, the vacuum system 22 may draw less particulate into or onto the air inlets of the metering system.

Figure 2:
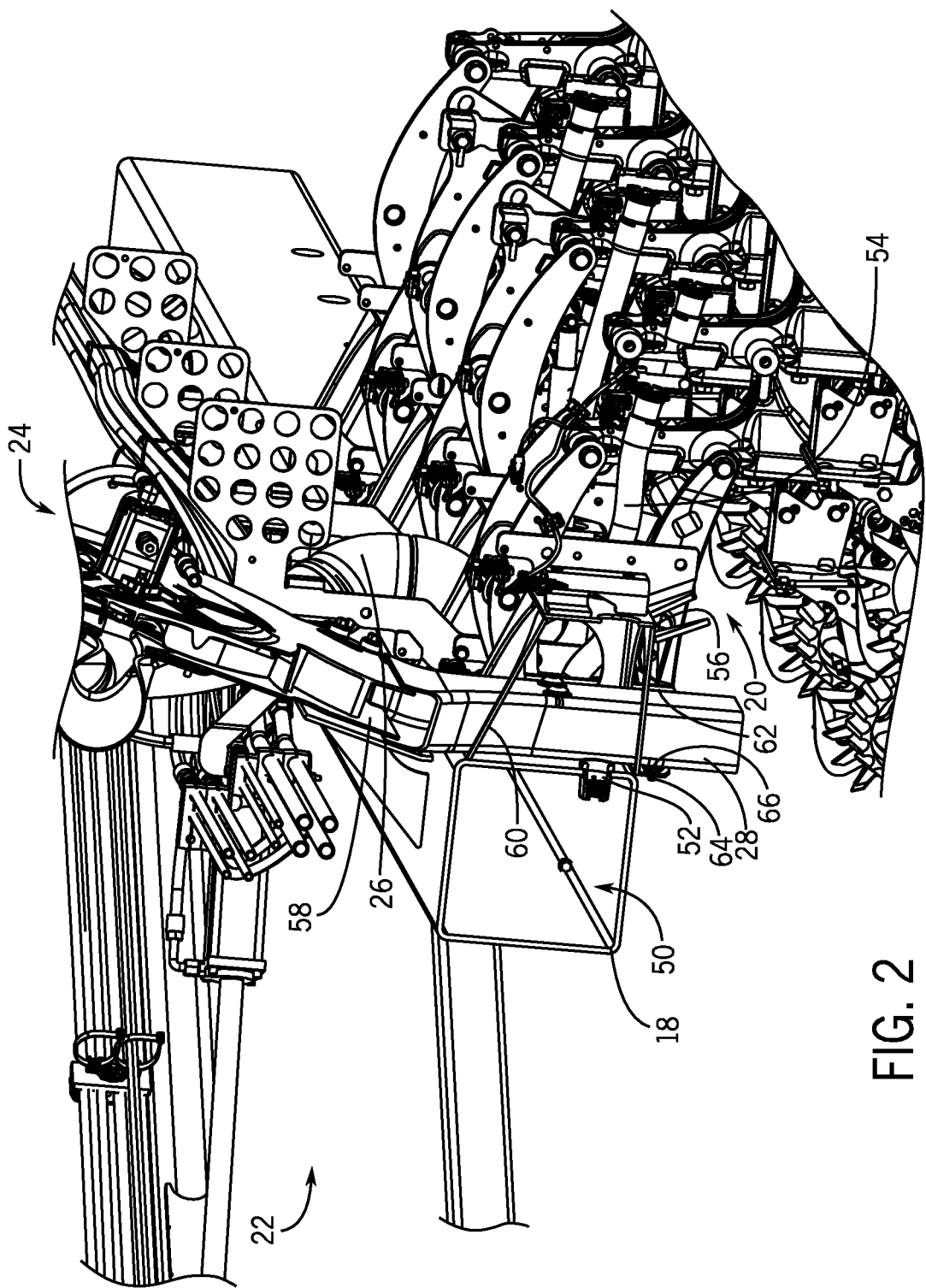
FIG. 2 is a partial cross-sectional view of a vacuum system, according to an embodiment of the disclosure.

FIG. 2 is a partial cross-sectional view of the vacuum system 22. As illustrated, the toolbar 18 forms a cavity or vacuum chamber 50. The toolbar 18 also defines a plurality of apertures 52 that enable hoses 54 to couple between the metering system and the vacuum chamber 50. The fan 24 similarly couple to the toolbar 18 with one or more conduits 26 that enable the fan 24 to draw air out of the vacuum chamber 50. As the fan 24 pulls air out of the vacuum chamber 50, air is drawn through the metering system through the hoses 54. The air enters the toolbar 18 and then flows through the toolbar 18 to the conduits 26. The conduits 26 direct the airflow to the fan 24, which then discharges the airflow through the exhaust duct 28.

As illustrated, the exhaust duct 28 couples to an outlet 58 of the fan 24 and extends through a bracket 56 (e.g., row bracket, offset row bracket). The bracket 56 couples to the toolbar 18 and provides the supporting connection between the toolbar 18 and the row unit 20. The bracket 56 defines an opening or inlet 60 and another opening or outlet 62 that enables the exhaust duct 28 to pass through the bracket 56. In addition to coupling to the fan 24, the exhaust duct 28 may also couple to the bracket 56 and/or the toolbar 18. For example, the exhaust duct 28 may couple to the bracket 56 with one or more fasteners 64 (e.g., threaded fasteners). In some embodiments, the exhaust duct 28 may be spaced from the toolbar 18. In order to create a gap between the toolbar 18 and the exhaust duct 28, the exhaust duct 28 may include one or more protrusions 66 (e.g., bosses).

Figure 3:
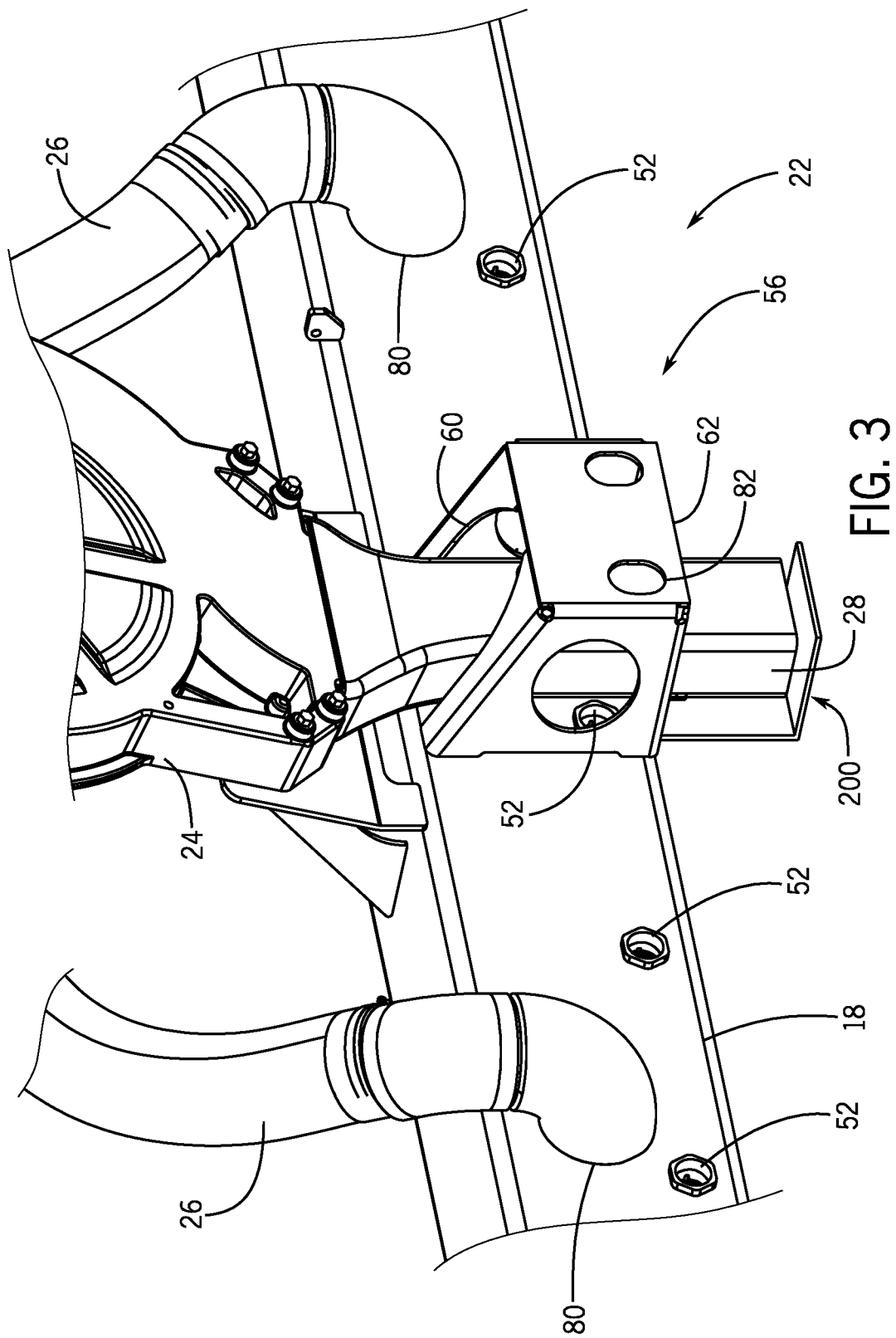
FIG. 3 is a partial perspective view of a vacuum system, according to an embodiment of the disclosure.

FIG. 3 is a partial perspective view of a vacuum system 22 with a diffuser 200. As mentioned above, the diffuser 200 reduces and/or blocks the discharged air from kicking up debris such as wheat chaff or other plant particulate. With less particulate in the air, the vacuum system 22 may draw less particulate into the metering system and reduced the amount of particulate that builds up against the air inlet vents. In order to create the vacuum pressure that draws air through the metering system, the toolbar 18 includes apertures that enable fluid communication between the metering system and the fan 24. These apertures include hose apertures 52 that couple the metering system to the toolbar 18. The toolbar 18 also includes conduit apertures 80 that enable the fan 24 to draw air through the conduits 26 and through the toolbar 18.

As illustrated, the exhaust duct 28 couples to the fan 24 and extends through the bracket 56 (e.g., row bracket, offset row bracket). The bracket 56 couples to the toolbar 18 and provides the supporting connection for a row unit 20. The bracket 56 may define a plurality of openings including the inlet 60 and the outlet 62 that enable the exhaust duct 28 to pass through the bracket 56. In addition to these apertures, the bracket 56 may define other apertures, such as a hose aperture 82 that enable the hose 54 to extend through the bracket 56.

Figure 4:
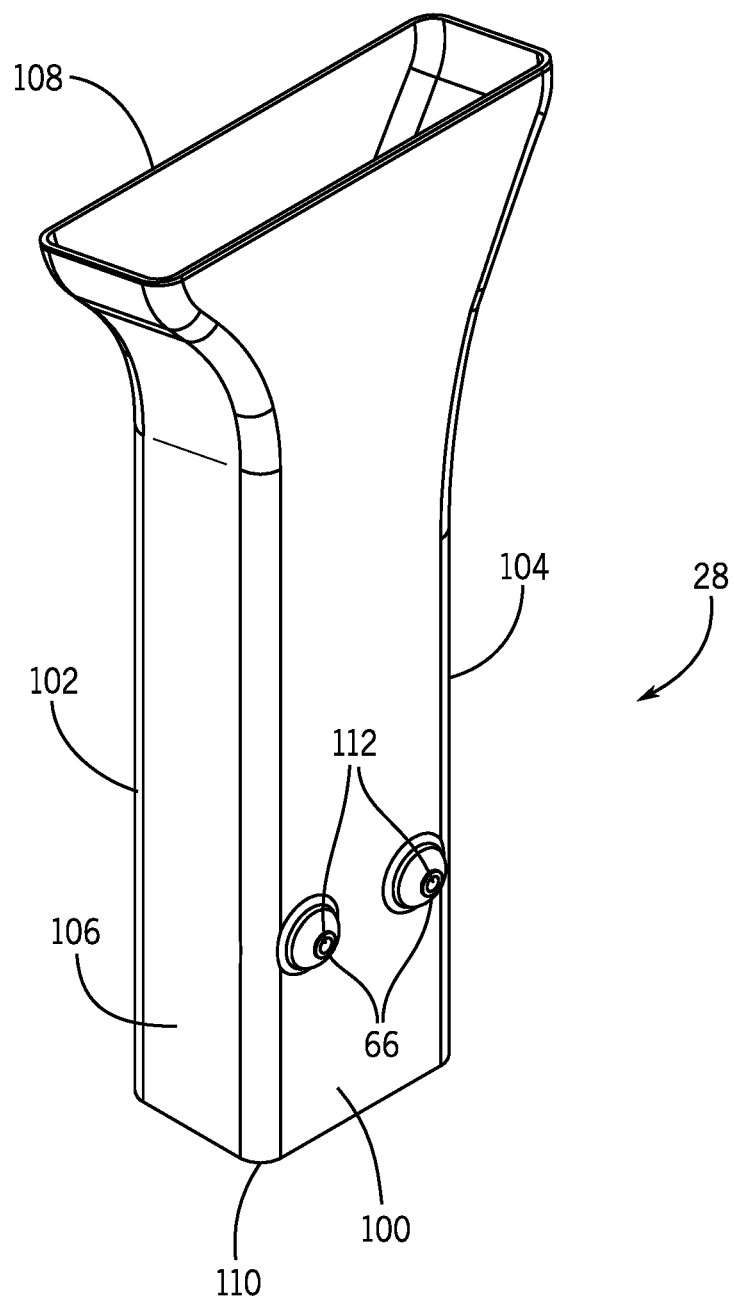
FIG. 4 is a perspective view of an exhaust duct, according to an embodiment of the disclosure.

FIG. 4 is a perspective view of an exhaust duct 28. The vacuum system 22 includes the exhaust duct 28 to direct airflow towards the ground, which may reduce the ability of particulate in the airflow from spreading. The exhaust duct 28 includes a rear wall 100, a front wall 102, a first sidewall 104, and a second sidewall 106. In operation, airflow from the fan 24 passes through the exhaust duct 28 between an inlet 108 and an outlet 110. In order to couple to the implement 10, the exhaust duct 28 may define one or more apertures 112. As illustrated, the apertures 112 are in a rear wall 100, but in some embodiments the apertures 112 may be in different walls (e.g., front wall 102, first sidewall 104, and/or second sidewall 106). In still other embodiments, the apertures 112 may be in protrusions or bosses 66 (e.g., 1, 2, 3, 4, or more) that space the exhaust duct 28 from the toolbar 18.

Figure 5:
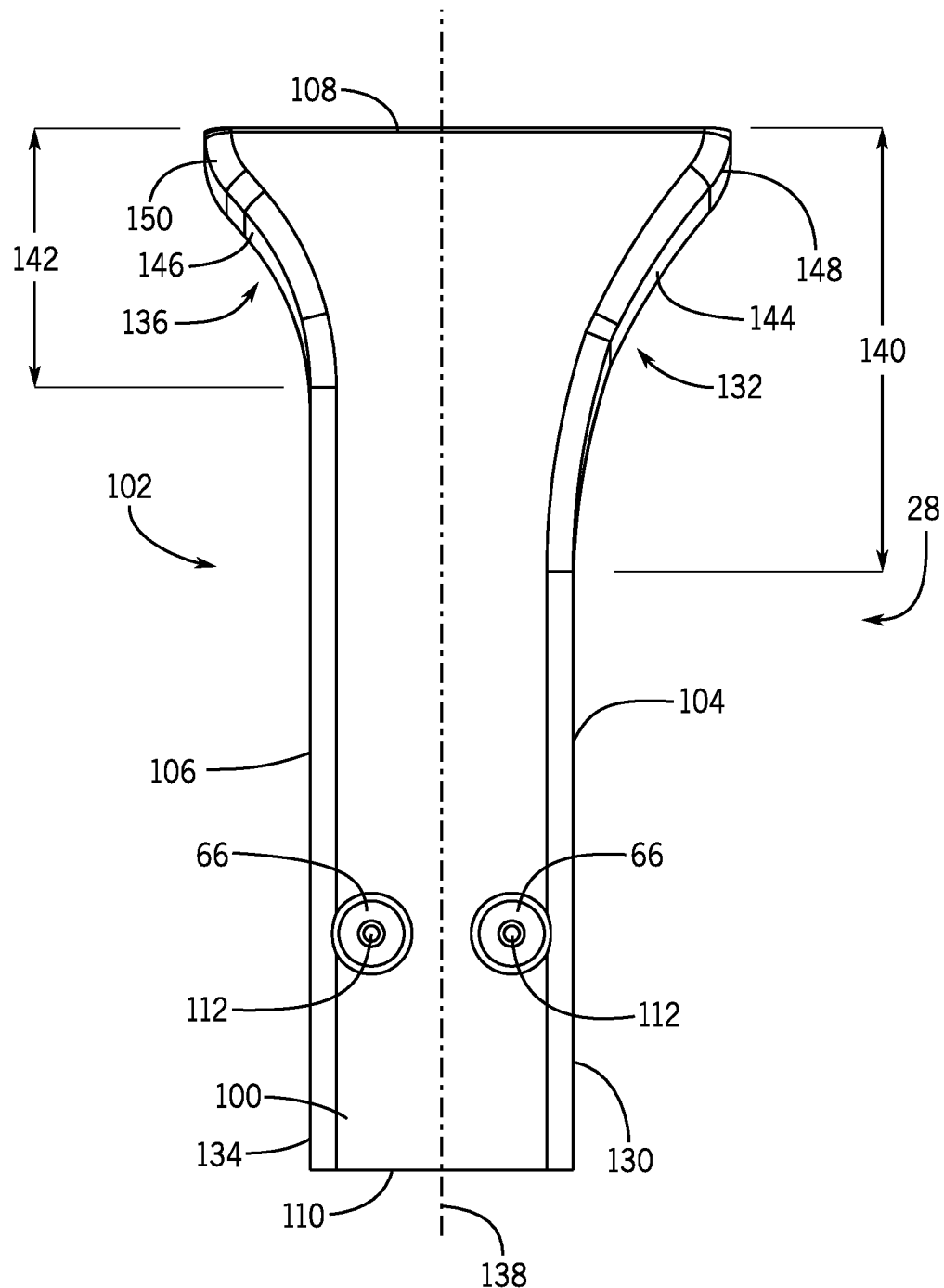
FIG. 5 is a rear view of the exhaust duct in FIG. 4, according to an embodiment of the disclosure.

FIG. 5 is a rear view of the exhaust duct 28 in FIG. 4. As illustrated, the first sidewall 104 and the second sidewall 106 may include one or more sidewall portions. For example, the first sidewall 104 may include a first sidewall straight portion 130 and a first sidewall curved portion 132. The second sidewall 106 may similarly include a second sidewall straight portion 134 and a second sidewall curved portion 136. As illustrated, the first sidewall curved portion 132 and the second sidewall curved portion 136 curve with respect to a central longitudinal axis 138 in order to decrease the width of the exhaust duct 28 at the outlet 110. The width of the exhaust duct 28 gradually reduces until the first sidewall curved portion 132 couples to the first sidewall straight portion 104, and the second sidewall curved portion 136 couples to the second sidewall straight portion 134. The change in width of the exhaust duct 28 enables the exhaust duct 28 to extend through the bracket 56. By extending through the bracket 56, the fan 24 discharges the airflow close to the ground (e.g., 6-36 inches, 6-30 inches, 6-24 inches, 6-18 inches from the ground) and thus blocks and/or reduces the spread of particulate carried in the airflow.

In some embodiments, the first sidewall curved portion 132 defines a length 140 that is greater than the length 142 of the second sidewall curved portion 136. The length 140 of the first sidewall curved portion 132 enables a greater radius of curvature that enables the gradual redirection of airflow from the inlet 108 to the outlet 110. For example, the fan 24 may not direct the airflow directly into the inlet 108 of the exhaust duct 28, or in other words the airflow may not flow parallel to the central axis 138 when entering the inlet 108. Instead, the airflow may enter the inlet 108 at an angle with respect to the central axis 138. For example, the airflow may be directed towards the first sidewall curved portion 132. As the airflow contacts the first sidewall curved portion 132, the gradual curve of the first sidewall curved portion 132 may reduce the turbulence of the airflow as the exhaust duct 28 directs the airflow to the outlet 110. As illustrated, the first sidewall curved portion 132 and the second sidewall curved portion 136 may include respective concave portions 144, 146 and respective convex portions 148, 150. The convex portions 148, 150 enable the inlet 108 to couple to the fan 24.

Figure 6:
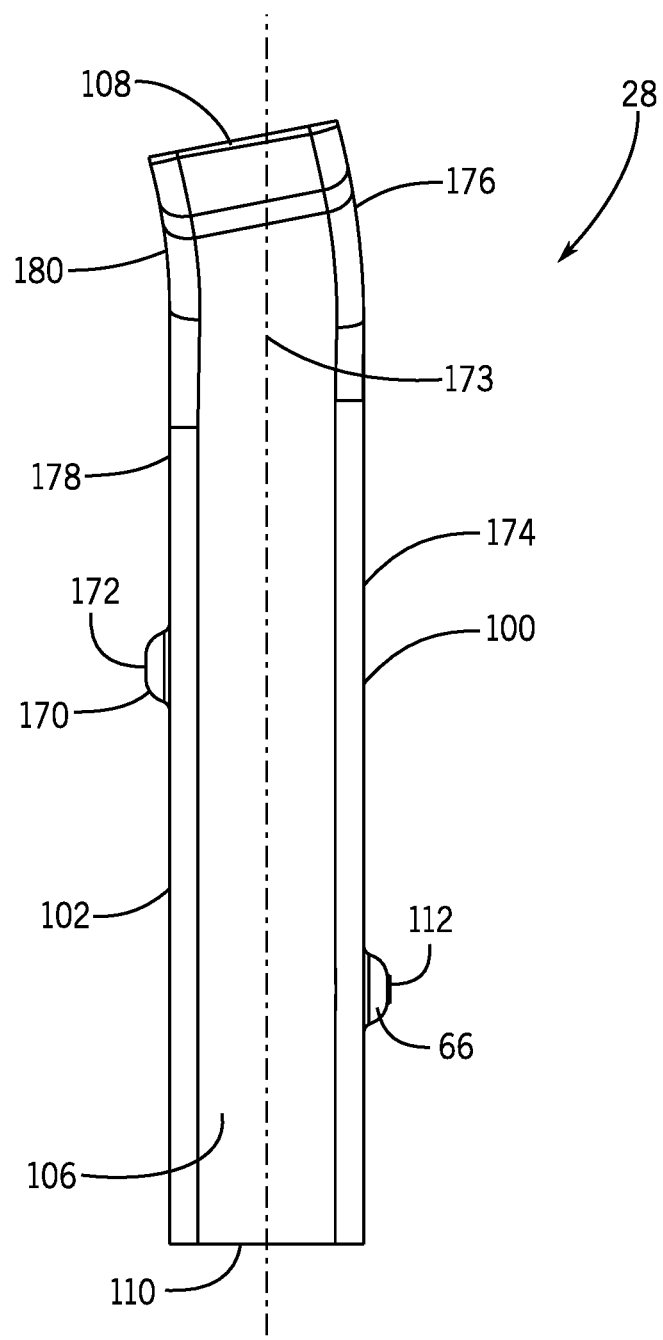
FIG. 6 is a side view of the exhaust duct in FIG. 4, according to an embodiment of the disclosure.

FIG. 6 is a side view of the exhaust duct 28 in FIG. 4. As illustrated, the rear wall 100 and the front wall 102 include respective protrusions 66 and 170. As explained above, the protrusions 66 may define apertures 112 that enable the protrusions 66 to couple to the implement 10 (e.g., bracket 56, toolbar 18). Likewise, the protrusions 170 may define apertures 172 that enable the exhaust duct 28 to couple to the implement 10 (e.g., bracket 56). Similar to the first and second sidewalls 104, 106, the rear wall 100 and the front wall 102 include curve portions with respect to a central axis 173. As illustrated, the rear wall 100 includes a straight portion 174 and a curved portion 176. The front wall 102 includes a straight portion 178 and a curved portion 180. In FIG. 6, the curved portion 176 of the rear wall 100 is convex while the curved portion 180 of the front wall 102 is concave. In other embodiments, the opposite may occur with the curved portion 176 being concave and the curved portion 180 being convex.

Figure 7:
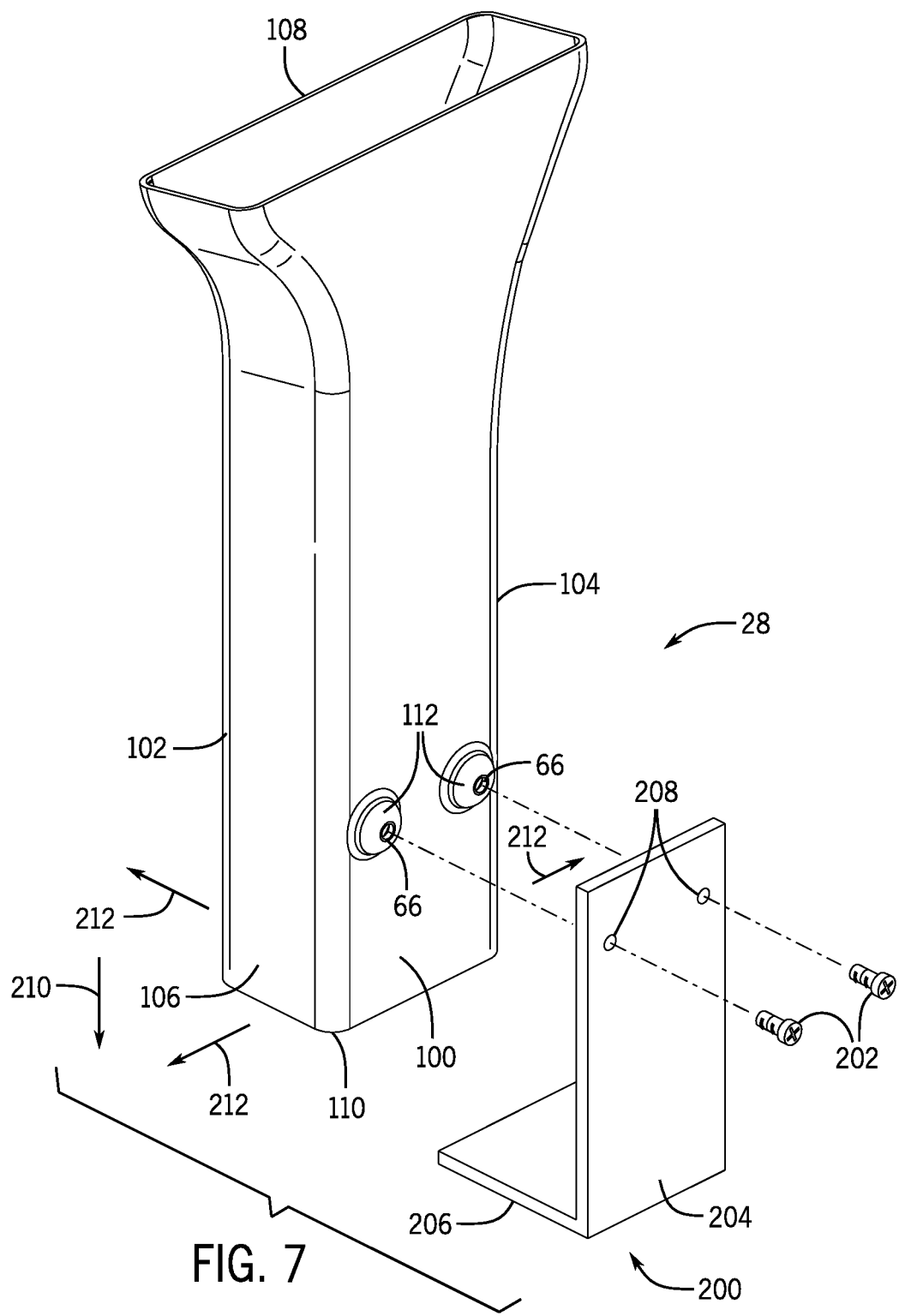
FIG. 7 is a perspective view of the exhaust duct in FIG. 4 with a diffuser, according to an embodiment of the disclosure.

FIG. 7 is a perspective view of the exhaust duct in FIG. 4 with a diffuser 200. As illustrated, the diffuser 200 may couple directly to the exhaust duct 28 with fasteners 202 (e.g., threaded fasteners). In some embodiments, the fasteners 202 may enter the apertures 112 to secure the diffuser 200 to the exhaust duct 28. The diffuser 200 includes a first portion or section 204 (e.g., wall) and a second portion or section 206 (e.g., wall). As illustrated, the first portion 204 defines one or more apertures 208. The apertures 208 receive respective fasteners 202 that enable the diffuser 200 to couple to the exhaust duct 28. In some embodiments, the diffuser 200 may also couple to the toolbar 18 and/or another portion of the implement 10. In still other embodiments, the diffuser 200 may couple to both the toolbar 18 as well as the exhaust duct 28 with the fasteners 202. For example, the fasteners 202 may pass through apertures on a bracket coupled to the toolbar 18 as well as the apertures 112 on the exhaust duct 28, which then couples the diffuser 200 to the toolbar 18 and to the exhaust duct 28.

As illustrated, the first portion 204 couples to the second portion 206. For example, the first portion 204 and the second portion 206 may be one-piece or integral. The first portion 204 and the second portion 206 may also be perpendicular or substantially perpendicular to each other enabling the second portion 206 to extend over the outlet 110. In this position, the second portion 206 blocks the flow of air passing through the exhaust duct 28 from flowing directly to the ground in direction 210. Instead, the air passing through the exhaust duct 28 contacts the second portion 206, which then directs the airflow radially outward in directions 212. As the airflow is directed radially outwards, the diffuser 200 blocks and/or reduces the ability of the airflow from contacting the ground with sufficient force to lift or kick up particulate, such as chaff (e.g., wheat chaff).

FIG. 8 is a partial cross-sectional side view of an exhaust duct 28 and a diffuser 230 that reduces the force of air flowing through the exhaust duct 28 before it contacts the ground. As explained above, particulate that lifts into the air may be sucked or drawn into the metering system by the force of the vacuum. The diffuser 230 includes a first portion 232 and a second portion 234 that couple together. For example, the first portion 232 and the second portion 234 may be one-piece or integral. The first portion 232 and the second portion 234 may also be perpendicular or substantially perpendicular to each other enabling the second portion 234 to extend over the outlet 110 of the exhaust duct 28. In this position, the second portion 234 reduces the flow of air 236 passing through the exhaust duct 28 from flowing directly to the ground in direction 210. Instead, a portion of the air 236 passing through the exhaust duct 28 contacts the second portion 234, which then directs the airflow radially outward in directions 238. In addition to diverting air 236 radially outward, the diffuser 230 may also enable air to flow through the diffuser 230. For example, the second portion 234 may include one or more apertures 240 (e.g., 1, 2, 3, 4, 5, 10, 50, 100) that enable a portion of the air 236 to pass through the second portion 234. Because only a portion of the air 236 passes through the second portion 234, the volume and force of the air is limited which blocks and/or reduces the ability of the airflow from contacting the ground with sufficient force to lift or kick up particulate, such as chaff (e.g., wheat chaff).

In some embodiments, the first portion 232 may also include apertures 242 (e.g., 1, 2, 3, 4, 5, 10, 50, 100). The apertures 242 may facilitate the flow of air radially outward after contacting the second portion 234. In other words, the apertures 242 may enable air to flow outward in all directions after contacting the second portion 234. In still other embodiments, the first portion 232 may include apertures and the second portion 234 may not. In this situation all of the air 236 contacting the second portion 234 may be directed radially outward, which includes flowing radially outward through the apertures 242.

In order to facilitate the flow of air 236 out of the exhaust duct 28, the second portion 234 may be spaced from the outlet 110 by a distance 244. The distance 244 may be between 1-5 inches, 1-4 inches, 1-3 inches. By spacing the second portion 234 from the outlet 110 a distance 244, the diffuser 230 may reduce the backpressure of the air 236 on the exhaust duct 28. In other words, the distance 244 may be such that it reduces work on the fan 24, while still enabling the diffuser 230 to reduce the force of the air contacting the ground.

FIG. 9 is a partial cross-sectional side view of an exhaust duct 28 and a diffuser 260 that reduces the force of air flowing through the exhaust duct 28 before it contacts the ground. The diffuser 260 includes a first portion 262 and a second portion 264 that couple together. For example, the first portion 262 and the second portion 264 may be one-piece or integral. As illustrated, the first portion 262 and the second portion 264 may be angled. That is, the first portion 262 may form an angle 266 (e.g., 91-170 degrees, 91-150 degrees, 91-130 degrees, 91-110 degrees) with the second portion 264. The angle 266 enables the diffuser 260 to gradually redirect the air 268 flowing through the exhaust duct 28 downward in direction 270. In some embodiments, the diffuser 260 may not form a distinct angle; but instead, the diffuser 260 may be curved. In some embodiments, the diffuser 260 may also enable air to flow through the diffuser 260. For example, the first portion 262 and/or second portion 264 may include one or more apertures (e.g., 1, 2, 3, 4, 5, 10, 50, 100) that enable a portion of the air 268 to pass through the diffuser 260 as it exits the exhaust duct 28.

In still other embodiments, the first portion 262 and the second portion 264 may rotatingly couple together. A spring may bias the second portion 264 towards the outlet 110 of the exhaust duct 28 (e.g., flap configuration). During operation, the force of the air 268 may drive the second portion 264 away from the outlet 110 to enable the air 268 to escape. As the air 268 contacts the second portion 264, the resistance of the spring enables the second portion 264 to absorb some of the force of the air 268, which slows and diffuses the airflow before it contacts the ground.

FIG. 10 is a partial cross-sectional side view of an exhaust duct 28 with a diffuser 280. As illustrated, the diffuser 280 may include a central portion 282. Extending from the central portion 282 is a first arm 284 and a second arm 286. The first and second arms 284, 286 couple to the exhaust duct 28 with respective fasteners 288 (e.g., threaded fasteners) that extend through apertures 290 in the arms 284, 286 before coupling to apertures 292 in the exhaust duct 28. Once coupled, the arms 284, 286 position the central portion 282 of the diffuser 280 below the outlet 110 of the exhaust duct 28. In this position, the central portion 282 is in the path of the air 294 exiting the exhaust duct 28. As the air 294 contacts the central portion 282, the central portion 282 redirects the air radially outward in direction 296. In some embodiments, the central portion 282 may include one or more apertures (e.g., 1, 2, 3, 4, 5, 10, 50, 100) that enable a portion of the air 294 to pass through the diffuser 280 as it exits the exhaust duct 28.

FIG. 11 is a partial cross-sectional side view of an exhaust duct 28 with a diffuser 320. The diffuser 320 may be cone-shaped or pyramid-shaped. The diffuser 320 may couple to the exhaust duct 28 with one or more fasteners 322 (e.g., threaded fasteners) that extend through apertures 324 in the exhaust duct 28 as well as through apertures 326 in the diffuser 320. As illustrated, a portion of the diffuser 320 may rest within the exhaust duct 28. As air 328 flows through the exhaust duct 28 towards the outlet 110, the air 328 contacts the diffuser 320 that then simultaneously guides the air 328 downward in direction 330 and radially outward in directions 332. It should be understood, that the diffuser 320 may also be position completely below the outlet 110 instead of including a portion within the exhaust duct 28. In some embodiments, the diffuser may also include one or more apertures (e.g., 1, 2, 3, 4, 5, 10, 50, 100) that enable a portion of the air 328 to pass through the diffuser 320 as it exits the exhaust duct 28.

In some embodiments, the dimensions of the diffuser 320 may change depending on the desired airflow characteristics. For example, a width 334 of the diffuser base 335 may vary to control the force the air 328 that contacts the ground. That is, the greater the width 334 of the base 335 the more the air 328 is directly radially outward. In contrast, a smaller base 335 may enable the air 328 to flow more directly toward the ground. As illustrated, the base of the cone-shaped or pyramid-shaped diffuser 320 may define a width 334 that is greater than the width 336 of the outlet 110. The base 335 may also be smaller than the width 336 of the outlet 110.

FIG. 12 is a partial cross-sectional side view of an exhaust duct 28 with a diffuser 350. In some embodiments, the diffuser 350 may be a plate 352 that rests within the exhaust duct 28. For example, the exhaust duct 28 may define apertures or slots 354 that enable a plate 352 to extend through the exhaust duct 28. The plate 352 may define a plurality of apertures (e.g., 1, 2, 3, 4, 5, 10, 50, 100) that enable the air 356 to pass through the plate 352 as it exits the exhaust duct 28. In some embodiments, the exhaust duct 28 may also define apertures in the walls. These apertures may be axially above and/or below the diffuser 350. The plate 352 may be held in place with a fastener 358 (e.g., threaded fastener) that couples to a first end 360 of the plate 352. When coupled, the fastener 358 blocks withdrawal of the plate 352 in direction 362. In order to block withdrawal of the plate in direction 364, the plate 352 may define a curved second end 366. The curved second end 366 blocks alignment of the plate 352 with the apertures 354 and therefore blocks removal of the plate 352 in direction 364. In some embodiments, instead of a curved second end 366, the diffuser 350 may include a second fastener that couples to the plate 352 and blocks removal of the plate 352 from the exhaust duct 28 in direction 364.

FIG. 13 is a partial perspective view of an exhaust duct 28 with a diffuser 380 positioned below the outlet 110. The diffuser 380 may be made out of rubber, plastic, and/or metal. As illustrated, the diffuser 380 includes ends 382 and 384 that extend from a central portion 386 (e.g., plate). The ends 382 and 384 wrap around the exhaust duct 28 enabling barbs or projections 387 on both ends 382, 384 to couple to the exhaust duct 28. The projections 387 extend into apertures 388 on the exhaust duct 28 to couple to the diffuser 380 to the exhaust duct 28. In operation, air passing through the exhaust duct 28 contacts the central portion 386, which deflects the airflow radially outwards between the ends 382, 384. In some embodiments, the central portion 386 and/or ends 382, 384 may define a plurality of apertures 388 (e.g., 1, 2, 3, 4, 5, 10, 50, 100) that enable air to pass through the diffuser 380 as well.

Figure 14:
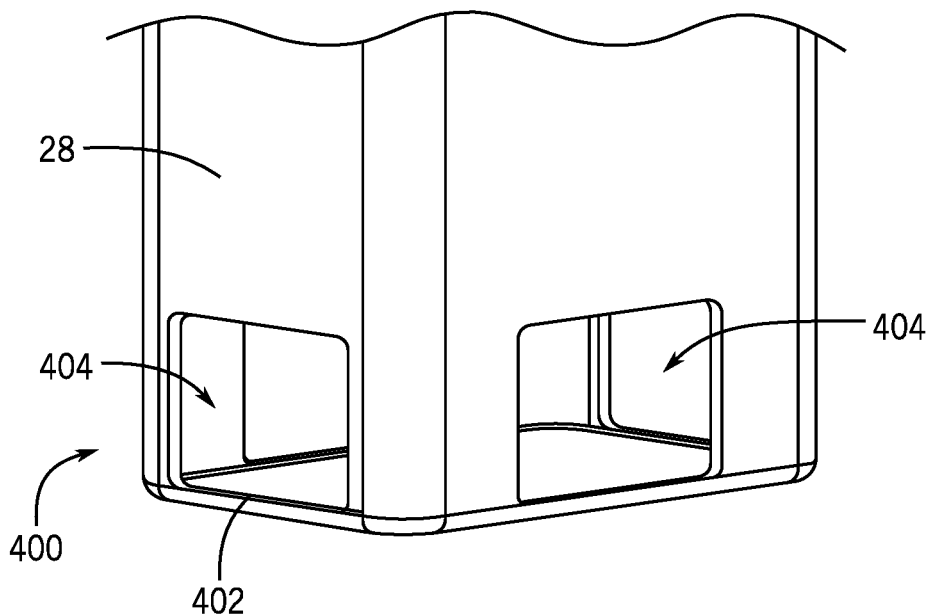
FIG. 14 is a partial perspective view of an exhaust duct with an integral diffuser, according to an embodiment of the disclosure.

FIG. 14 is a partial perspective view of an exhaust duct 28 with a diffuser 400. The diffuser 400 includes a plate 402 that couples to the exhaust duct 28. In operation, air passing through the exhaust duct 28 contacts the plate 402 and is redirected outward through apertures 404 formed in the walls of the exhaust duct 28. As illustrated, there are four apertures 404, one in each wall. However, the number of apertures 404 may vary depending on the embodiment. For example, a single wall may define an aperture 404 or each wall may define more than one aperture (e.g., 1, 2, 3, 4, 5, or more). The plate 402 may also define apertures (e.g., 1, 2, 3, 4, 5, 10, 50, 100) that enable air to pass through. In some embodiments, the plate 402 and the exhaust duct 28 may be one-piece.

Figure 15:
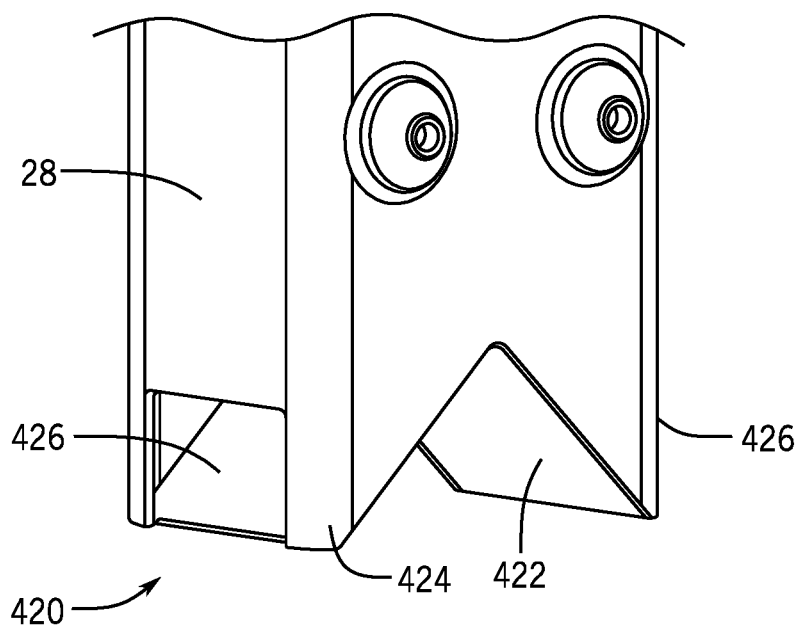
FIG. 15 is a partial perspective view of an exhaust duct with an integral diffuser, according to an embodiment of the disclosure.

FIG. 15 is a partial perspective view of an exhaust duct 28 with a diffuser 420. As illustrated, the diffusor 420 may be a V-shaped plate 422 that couples to a V-shaped end 424 of the exhaust duct 28. As air flows through the exhaust duct 28, the air contacts the V-shaped plate 422 which then guides the air flow out of the exhaust duct 28 through apertures 426. As illustrated, there are two apertures 426. However, the number of apertures 426 may vary depending on the embodiment. The V-shaped plate 422 may also define apertures (e.g., 1, 2, 3, 4, 5, 10, 50, 100) that enable air to pass through. In some embodiments, the V-shaped plate 422 and the exhaust duct 28 may be one-piece.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A vacuum system, comprising:
   a toolbar;
   a row unit bracket configured to individually couple a respective row unit to the toolbar;
   a fan coupled to the toolbar and configured to draw air through a metering system of the respective row unit;
   an exhaust duct extending through the row unit bracket, wherein the exhaust duct is coupled to the fan and configured to discharge airflow from the fan toward a ground; and
   a diffuser configured to reduce a speed of the airflow, to redirect the airflow, or a combination thereof, as the airflow exits the exhaust duct.

2. The system of claim 1, wherein the diffuser comprises a first section and a second section, wherein the second section is positioned downstream from an outlet of the exhaust duct.

3. The system of claim 2, wherein the second section extends over the outlet of the exhaust duct.

4. The system of claim 2, wherein the second section covers a portion of the outlet of the exhaust duct.

5. The system of claim 2, wherein the second section is angled relative to the ground.

6. The system of claim 2, wherein the second section is perforated.

7. The system of claim 1, wherein the diffuser defines a conical surface.

8. The system of claim 7, wherein a portion of the conical surface rests within the exhaust duct.

9. The system of claim 1, wherein the diffuser comprises a flexible material.

10. The system of claim 9, wherein the exhaust duct defines a slot configured to receive a perforated plate.

11. A vacuum system, comprising:
    an exhaust duct configured to extend through a row unit bracket, wherein the exhaust duct is configured to couple to a fan configured to draw air through a metering system of a respective row unit, the exhaust duct is configured to discharge airflow from the fan toward a ground, and the row unit bracket is configured to individually couple the respective row unit to a toolbar; and
    a diffuser configured to reduce a speed of the airflow, to redirect the airflow, or a combination thereof, as the airflow exits the exhaust duct.

12. The system of claim 11, wherein the diffuser comprises a first section and a second section, wherein the second section is positioned downstream from an outlet of the exhaust duct.

13. The system of claim 12, wherein the second section is angled relative to the ground.

14. The system of claim 12, wherein the second section is perforated.

15. The system of claim 11, wherein the diffuser defines a conical surface.

16. The system of a claim 11, wherein the diffuser comprises a flexible material.

17. A vacuum system, comprising:
    a row unit bracket configured to individually couple a respective row unit to a toolbar;
    an exhaust duct extending through the row unit bracket, wherein the exhaust duct is configured to couple to a fan configured to draw air through a metering system of the respective row unit, and the exhaust duct is configured to discharge airflow from the fan toward a ground; and
    a diffuser configured to reduce a speed of the airflow, to redirect the airflow, or a combination thereof, as the airflow exits the exhaust duct.

18. The system of claim 17, wherein the diffuser comprises a plate downstream from an outlet of the exhaust duct.

19. The system of claim 17, wherein the diffuser comprises a flexible material.

20. The system of claim 17, wherein the diffuser comprises a surface that forms an angle relative to the ground.

* * * * *